United States Patent
Suga et al.

(10) Patent No.: US 10,848,373 B2
(45) Date of Patent: Nov. 24, 2020

(54) PROCESSOR AND INFORMATION PROCESSING APPARATUS

(71) Applicant: FUJITSU LIMITED, Kawasaki (JP)

(72) Inventors: Makoto Suga, Edogawa (JP); Shun Ando, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/439,788

(22) Filed: Jun. 13, 2019

(65) Prior Publication Data
US 2020/0028729 A1 Jan. 23, 2020

(30) Foreign Application Priority Data
Jul. 20, 2018 (JP) ................. 2018-136597

(51) Int. Cl.
*H04L 12/24* (2006.01)
*H04L 12/26* (2006.01)

(52) U.S. Cl.
CPC ...... *H04L 41/0654* (2013.01); *H04L 41/0893* (2013.01); *H04L 43/0823* (2013.01)

(58) Field of Classification Search
None
See application file for complete search history.

(56) References Cited

U.S. PATENT DOCUMENTS

| 10,362,117 B1 * | 7/2019 | Nelson ............ H04L 45/02 |
| 2017/0256328 A1 * | 9/2017 | Ouyang ............ G11C 7/06 |
| 2017/0302570 A1 * | 10/2017 | Liu ............ H04L 41/0896 |
| 2019/0206477 A1 * | 7/2019 | Kim ............ G11C 16/0483 |
| 2019/0207806 A1 * | 7/2019 | Watanabe ...... H04L 43/0811 |

FOREIGN PATENT DOCUMENTS

| JP | 2010-113751 | 5/2010 |
| JP | 2014-241082 | 12/2014 |

OTHER PUBLICATIONS

SK Hynix, "TSV based Memory Solutions Engaging in IoT & IoETrend", pp. 25, [online], MemCon, Santa Clara, 2015, [searched on May 29, 2018], Internet <http://www.memcon.com/pdfs/proceedings2015/MKT105_SKhynix.pdf> (31 pages).

* cited by examiner

*Primary Examiner* — Gregory B Sefcheck
*Assistant Examiner* — Srinivasa R Reddivalam
(74) *Attorney, Agent, or Firm* — Fujitsu Patent Center

(57) ABSTRACT

A processor includes a controller that measures an error rate of a signal that propagates through a communication line; switches to use a spare line to perform a first communication when a first error rate of a signal that propagates through a first communication line of a first line group exceeds a first threshold, the first communication being performed using the first communication line; and switches to use the first communication line to perform the first communication and switches to use the spare line to perform a second communication when the first communication is performed using the spare line, when a second error rate of a signal that propagates through a second communication line of a second line group exceeds a second threshold higher than the first threshold, and when the first error rate is lower than the second threshold; and a processor core that exchanges information via the controller.

3 Claims, 10 Drawing Sheets

FIG.3

PROCESSOR AND INFORMATION PROCESSING APPARATUS

CROSS-REFERENCE TO RELATED APPLICATION

This application is based upon and claims the benefit of priority of the prior Japanese Patent Application No. 2018-136597, filed on Jul. 20, 2018, the entire contents of which are incorporated herein by reference.

FIELD

The embodiments discussed herein are related to a processor and an information processing apparatus.

BACKGROUND

In recent years, a new stacking technology such as CoWoS® has been developed, and the implementation of mounting a processor and a memory in the same package is beginning to increase. However, this causes a difficulty in an alternation of each mounted component, which may lead to a deterioration in the yield and repair cost.

Accordingly, when a failure occurs in a communication line that connects a high bandwidth memory (HBM) which is a memory manufactured by the above-described stacking technology and its memory controller to each other, the HBM and the memory controller have a function to perform a communication with each other using a spare line, instead of the communication line in which the failure occurs.

In addition, as for the spare line used by the HBM and the memory controller, one spare line is provided for every two communication line groups (each communication line group propagates a data signal, a data mask signal, and a data inversion control signal).

Related techniques are disclosed in, for example, Japanese Laid-open Patent Publication No. 2014-241082 and Japanese Laid-open Patent Publication No. 2010-113751.

Related techniques are disclosed in, for example, SK Hynix, "TSV based Memory Solutions Engaging in IoT & IoETrend," p. 25, [online], 2015, MemCon, Santa Clara, <searched at May 29, 2018>, Internet <http://www.memcon.com/pdfs/proceedings2015/MKT105_SKhynix.pdf>.

As described above, only one spare line is provided for every two communication line groups. Therefore, when a spare line is already used in one of the two communication line groups, the other communication line group may not use the spare line even though the other communication line group has a communication line of which an error rate is higher than that of the communication line included in the one communication line group. As a result, the stability of the communication may be deteriorated.

SUMMARY

According to an aspect of the embodiments, a processor includes a memory control circuit connected to a memory by a first communication line group and a second communication line group and the memory control circuit configured to: measure an error rate of a signal that propagates through a communication line included in each of the first communication line group and the second communication line group; switch to use a spare line to perform a first communication with the memory when a first error rate of a signal that propagates through a first communication line included in the first communication line group exceeds a first threshold value, the first communication being a communication performed using the first communication line; and switch to use the first communication line to perform the first communication and switch to use the spare line to perform a second communication with the memory when the first communication is performed using the spare line, when a second error rate of a signal that propagates through a second communication line included in the second communication line group exceeds a second threshold value higher than the first threshold value, and when the first error rate is lower than the second threshold value, the second communication being a communication performed using the second communication line; and a processor core configured to exchange information with the memory via the memory control circuit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of an information processing apparatus and a processor according to a second embodiment;

DESCRIPTION OF EMBODIMENTS

Hereinafter, embodiments of the present disclosure will be described with reference to the accompanying drawings.

First Embodiment

Figure 1:
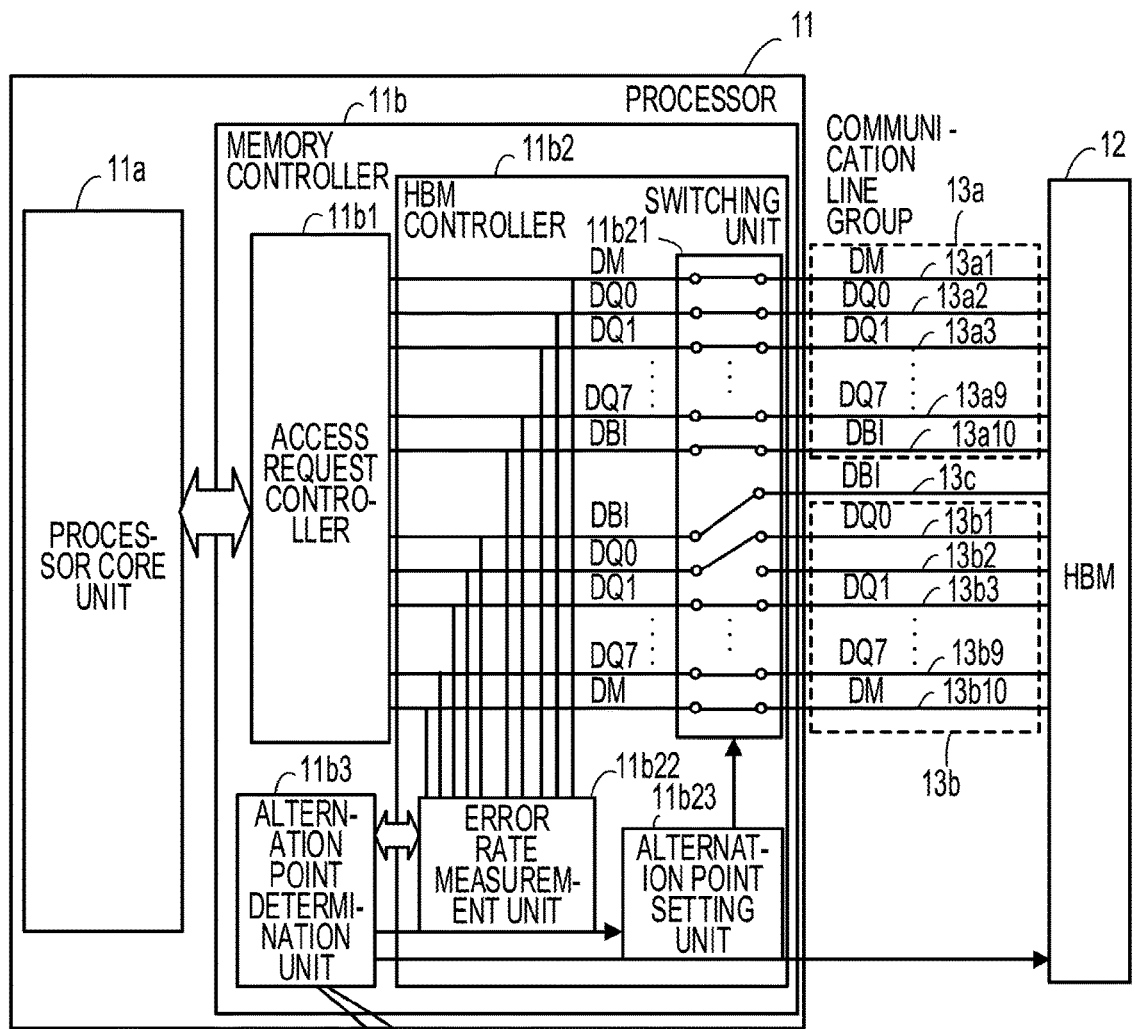
FIG. 1 is a view illustrating an example of an information processing apparatus according to a first embodiment.

FIG. 1 is a view illustrating an example of an information processing apparatus according to a first embodiment.

An information processing apparatus 10 includes a processor 11, an HBM 12, communication line groups 13a and 13b that connect the processor 11 and the HBM 12 to each other, and a spare line 13c.

The processor 11 is, for example, a central processing unit (CPU), a digital signal processor (DSP), a graphics processing unit (GPU) or the like, and includes a processor core unit 11a and a memory controller 11b.

The processor core unit 11a has a cache memory device and the like in addition to a processor core, and exchanges information with the HBM 12 via the memory controller 11b.

The memory controller 11b is connected to the HBM 12 by a plurality of communication lines in which one spare line is provided for every two communication line groups.

Hereinafter, for the sake of simplification, an example in which the two communication line groups 13a and 13b and the spare line 13c are used as the plurality of communication lines will be described. The communication line group 13a includes communication lines 13a1, 13a2, 13a3, . . . , 13a9, and 13a10. When the spare line 13c is not used as one communication line of the communication line group 13a, data signals DQ0, DQ1, . . . , and DQ7, and a data mask signal DM and a data inversion control signal DBI which will be described later are propagated by the communication lines 13a1 to 13a10. The communication line group 13b includes communication lines 13b1, 13b2, 13b3, . . . , 13b9, and 13b10. When the spare line 13c is not used as one communication line of the communication line group 13b, the same signals as described above are propagated by the communication lines 13b1 to 13b10.

The memory controller 11b includes an access request controller 11b1, an HBM controller 11b2, and an alternation point determination unit 11b3.

The access request controller 11b1 outputs the data mask signal DM, the data signals DQ0 to DQ7, and the data inversion control signal DBI based on an access request to the HBM 12, write data and the like which are supplied from the processor core unit 11a. In addition, the access request controller 11b1 receives read data which is read from the HBM 12 as the data signals DQ0 to DQ7, and transmits the read data to the processor core unit 11a.

Further, when the logic level of each bit of the write data has more L (Low) than H (High), the access request controller 11b1 has a function to invert the logic levels of the respective bits of the write data to generate the data signals DQ0 to DQ7. This is because the HBM 12 consumes a relatively more power when processing a signal with a logic level of L than when processing a signal with a logic level of H.

The data mask signal DM is a signal for masking the data signals DQ0 to DQ7. For example, when the logic level of the data mask signal DM is H, the data signals DQ0 to DQ7 are not written in the HBM12.

The data inversion control signal DBI is a signal indicating whether or not the access request controller 11b1 inverts the logic levels of the respective bits of the write data.

Other information than the above-described information (e.g., address information) may be exchanged between the memory controller 11b and the HBM 12, and description thereof will be omitted for the sake of simplification.

The HBM controller 11b2 includes a switching unit 11b21, an error rate measurement unit 11b22, and an alternation point setting unit 11b23.

The switching unit 11b21 switches a communication line that is being used, based on setting information set in the alternation point setting unit 11b23.

The error rate measurement unit 11b22 detects errors of signals propagating through the communication lines 13a1 to 13a10 and 13b1 to 13b10 included in the communication line groups 13a and 13b, respectively, and counts the number of errors in a predetermined period, to measure the error rates. The errors of the signals propagating through the communication lines 13a1 to 13a10 and 13b1 to 13b10 included in the communication line groups 13a and 13b, respectively, may be detected, for example, using an ECC (Error Check Code) stored in the HBM 12.

The setting information acquired from the alternation point determination unit 11b3 is set in the alternation point setting unit 11b23. The alternation point setting unit 11b23 is implemented by, for example, a plurality of registers.

The alternation point determination unit 11b3 generates setting information indicating an alternation point (a communication line to be brought into an unused state), based on a result of a comparison between the error rates and two threshold values TH1 and TH2 (TH1<TH2). For example, when the error rate of a signal propagating through a communication line that belongs to the communication line group 13a of the communication line groups 13a and 13b exceeds the threshold value TH1, the alternation point determination unit 11b3 sets the communication line as an alternation point. In this case, the spare line 13c is used as one communication line of the communication line group 13a. It is assumed that when the spare line 13c is used instead of the communication line that belongs to the communication line group 13a, the error rate of the communication line becomes lower than the threshold value TH2 and the error rate of a signal propagating through a communication line that belongs to the communication line group 13b becomes higher than the threshold value TH2. At this time, the alternation point determination unit 11b3 sets the communication line that belongs to the communication line group 13b as an alternation point. In this case, the spare line 13c is used as one communication line of the communication line group 13b, and the communication line that belongs to the communication line group 13a and has been brought into an unused state is used for the communication with the HBM 12.

In addition, the threshold value TH1 is, for example, a degree of an error rate at which a communication is possible (a degree at which a stable communication cannot be performed), and the threshold TH2 is, for example, a high error rate at which a communication cannot be performed at all. The threshold value TH2 may be an upper limit value of the error rate at which a communication is possible.

Hereinafter, an example of a communication line alternation operation by the information processing apparatus 10 will be described.

First, it is assumed that the spare line 13c is not being used. The alternation point determination unit 11b3 receives an error rate of a signal that propagates through each communication line from the error rate measurement unit 11b22 every predetermined period.

For example, when the error rate BER1 of a signal that propagates through the communication line 13a3 of the communication line group 13a (the data signal DQ1 in the example of FIG. 1) exceeds the threshold value TH1, the alternation point determination unit 11b3 generates setting information in which the communication line 13a3 is set as an alternation point. This setting information is set in the alternation point setting unit 11b23. Then, based on the setting information set in the alternation point setting unit 11b23, the switching unit 11b21 switches the communication line that is being used to bring the communication line 13a3 into an unused state and perform a communication using the spare line 13c instead.

Although not illustrated, the HBM 12 also includes components that correspond to the switching unit 11b21 and the alternation point setting unit 11b23. The setting information generated by the alternation point determination unit 11b3 is sent to the HBM 12, and the same operation as performed in the switching unit 11b21 is performed in the HBM 12 based on the setting information.

It is assumed that when the spare line 13c is used instead of the communication line 13a3, the error rate BER1 becomes lower than the threshold value TH2 and the error rate BER2 of a signal that propagates through the communication line 13b2 that belongs to the communication line group 13b (the data signal DQ0 in the example of FIG. 1) becomes higher than the threshold TH2. In this case, the alternation point determination unit 11b3 generates setting information in which the communication line 13b2 is set as an alternation point. This setting information is set in the alternation point setting unit 11b23 in the same way as described above. Then, based on the setting information set in the alternation point setting unit 11b23, the switching unit 11b21 switches the communication line that is being used to bring the communication line 13b2 into an unused state and perform a communication using the spare line 13c instead.

At this time, as illustrated in FIG. 1, the switching unit 11b21 may switch the communication line 13b2 to the next communication line 13b1 to propagate the data signal DQ0, rather than directly switching the communication line 13b2 to the spare line 13c. In this case, the switching unit 11b21 performs the switching such that the data inversion control signal DBI propagated by the communication line 13b1 is propagated using the spare line 13c. The switching unit 11b21 that performs the switching may be implemented using a plurality of 2-input selectors that output one of the two signals to any one of the communication lines 13a1 to 13a10 and 13b1 to 13b10 and the spare line 13c based on the setting information.

In addition, the switching unit 11b21 switches the communication line that is being used to perform a communication using the communication line 13a3 that has been brought into an unused state. The same operation is performed in the HBM 12.

According to the information processing apparatus 10 and the processor 11 described above, since one spare line 13c provided for every two communication line groups 13a and 13b is used with priority in a communication line group to which a communication line that has a relatively high error rate belongs, a relatively worse communication line is salvaged and the communication stability is enhanced.

In addition, when the threshold TH2 is set to the high error rate at which a communication cannot be performed at all or the upper limit value of the error rate at which a communication is possible, the spare line 13c is used with priority in a communication line group to which an incommunicable communication line belongs, so that it is possible to prevent the occurrence of an incommunicable state.

Comparative Example

Figure 2:
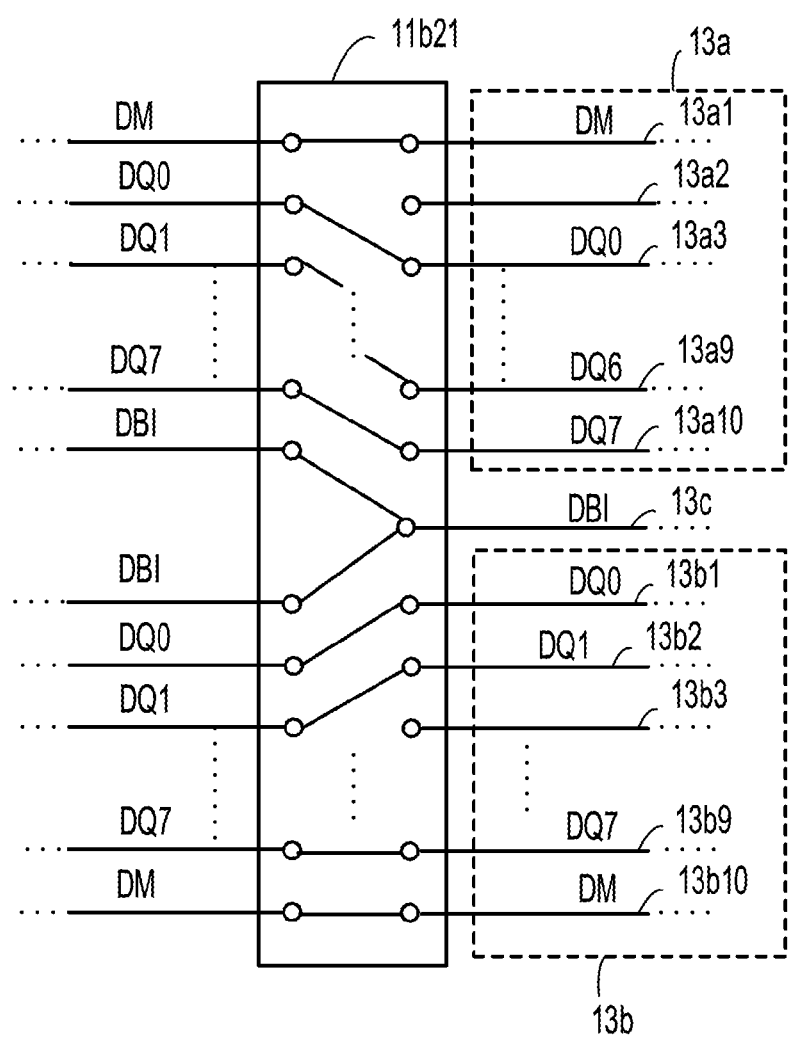
FIG. 2 is a view illustrating an example in which one communication line in each of two communication line groups is brought into an unused state.

FIG. 2 is a view illustrating an example in which one communication line in each of the two communication line groups is brought into an unused state.

FIG. 2 illustrates an example in which the communication line 13a2 in the communication line group 13a is brought into an unused state, and the communication line 13b3 in the communication line group 13b is brought into an unused state. In this case, both the data inversion control signal DBI to be propagated in the communication line group 13a and the data inversion control signal DBI to be propagated in the communication line group 13b are propagated to the spare line 13c, and as a result, the data inversion control signals DBI cannot be used. Thus, the power consumption of the HBM 12 may increase.

According to the information processing apparatus 10 and the processor 11 of the first embodiment, since the spare line 13c is used with priority in a communication line group to which a communication line having a relatively high error rate belongs, of the communication line groups 13a and 13b, the data inversion control signal DBI is not sacrificed.

Second Embodiment

Figure 3:
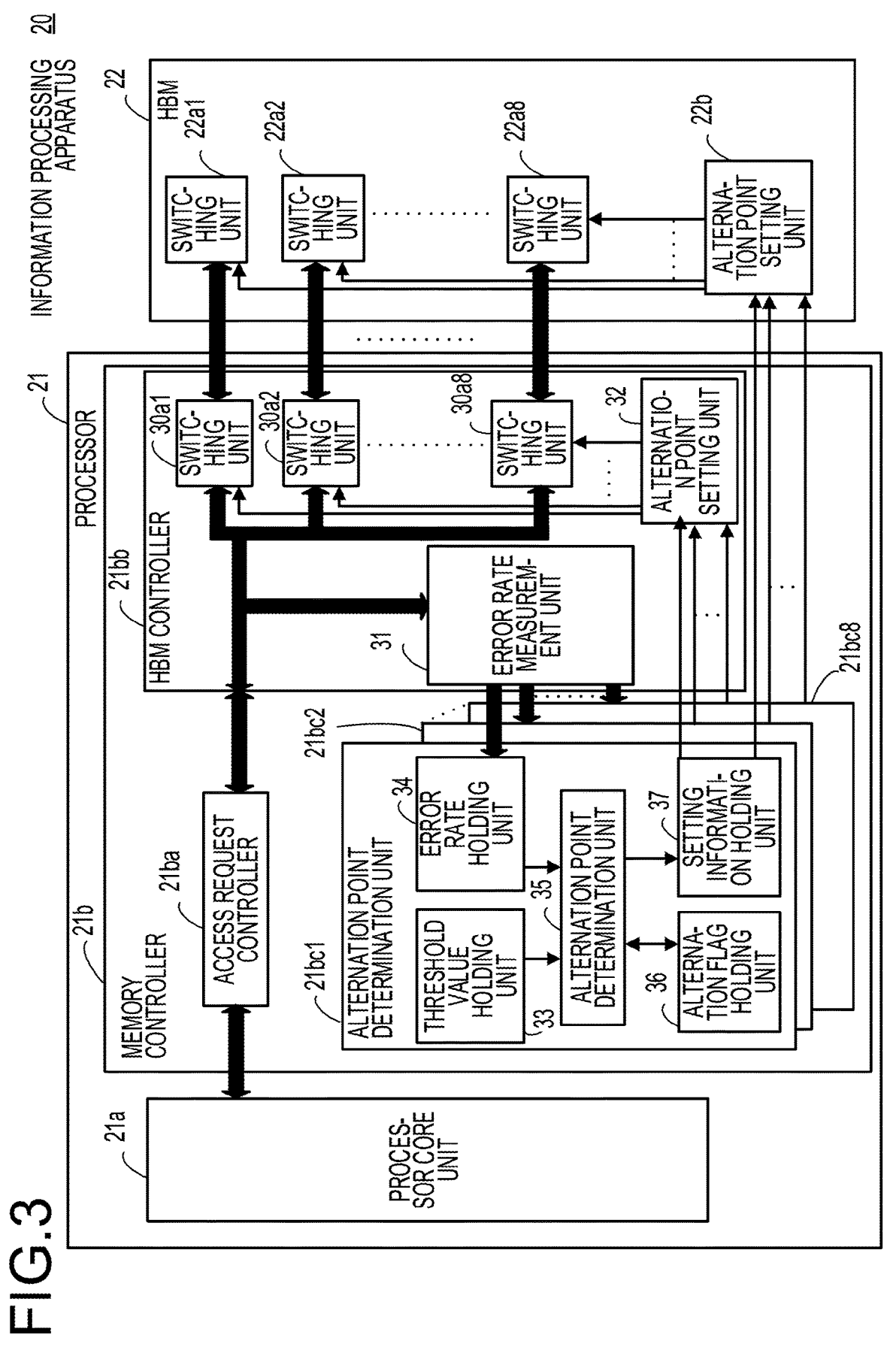

FIG. 3 is a view illustrating an example of an information processing apparatus and a processor according to a second embodiment.

The information processing apparatus 20 includes a processor 21 and an HBM 22.

The processor 21 is, for example, a CPU, a DSP, a GPU or the like, and includes a processor core unit 21a and a memory controller 21b, similarly to the processor 11 of the first embodiment.

The processor core unit 21a has the same function as the processor core unit 11a of the processor 11 of the first embodiment.

The memory controller 21b is connected to the HBM 22 by a plurality of communication lines in which one spare line is provided for every two communication line groups. In FIG. 3, two communication line groups and one spare line as illustrated in FIG. 1 are collectively illustrated by one arrow, and 8 communication line arrays each of which includes two communication line groups and one spare line are provided. When 8-bit data (the eight data signals DQ0 to DQ7) are propagated per communication line group as illustrated in FIG. 1, a total of 8×2×8=128 bits of data are propagated in the example of FIG. 1. In addition, although not illustrated, when the plurality of communication lines indicated by the eight arrows as described above constitute one channel, a plurality of channels (e.g., eight channels) may be provided between the HBM 22 and the memory controller 21b. The configuration for performing a communication using other channels is similar to the configuration illustrated in FIG. 3. When the number of channels is eight, 128×8=1024 bits of data may be exchanged between the HBM 22 and the memory controller 21b.

In addition, the number of communication line arrays each of which includes two communication line groups and one spare line or the number of channels is not limited to eight.

The memory controller 21b includes an access request controller 21ba, an HBM controller 21bb, and alternation point determination units 21bc1, 21bc2, . . . , and 21bc8.

The access request controller 21ba has the same function as that of the access request controller 11b1 of the processor 11 of the first embodiment.

The HBM controller 21bb includes eight switching units 30a1, 30a2, . . . , and 30a8, an error rate measurement unit 31, and an alternation point setting unit 32 in accordance with the number of communication line arrays each of which includes two communication line groups and one spare line.

Each of the switching units 30a1 to 30a8 switches a communication line that is being used, based on setting information set in the alternation point setting unit 32.

The error rate measurement unit 31 detects errors of signals that propagate through the communication lines included in each communication line group, and counts the number of errors in a predetermined period, to measure the error rates. The error rate measurement unit 31 detects the errors by, for example, an ECC. Then, the error rate measurement unit 31 supplies the measurement result of the error rates for each of the eight arrays and an update control signal for updating the error rate to a corresponding alternation point determination unit among the alternation point determination units 21bc1 to 21bc8.

The setting information acquired from the alternation point determination units 21bc1 to 21bc8 is set in the alternation point setting unit 32. The alternate point setting unit 32 is implemented by, for example, a plurality of registers.

The HBM 22 is also provided with switching units 22a1, 22a2, . . . , and 22a8 which are similar to the switching units 30a1 to 30a8, and an alternation point setting unit 22b which is similar to the alternation point setting unit 32.

The alternation point determination unit 21bc1 includes a threshold value holding unit 33, an error rate holding unit 34, an alternation point determination unit 35, an alternation flag holding unit 36 and a setting information holding unit 37. Each of the alternation point determination units 21bc2 to 21bc8 has the same components as those in the alternation point determination unit 21bc1.

The threshold value holding unit 33 holds the two threshold values TH1 and TH2 (TH1<TH2) as described above regarding the information processing apparatus 10 of the first embodiment.

The error rate holding unit 34 holds an error rate of each signal propagating through the communication lines included in the two communication line groups. Further, when an update of an error rate is instructed by an update control signal supplied from the error rate measurement unit 31, the error rate holding unit 34 updates the held error rate with an error rate supplied together with the update control signal.

The alternation point determination unit 35 compares the error rate held in the error rate holding unit 34 with the threshold values TH1 and TH2 held in the threshold value holding unit 33. Then, based on a result of the comparison and two alternation flags held in the alternation flag holding unit 36, the alternation point determination unit 35 determines whether or not to perform the communication with the HBM 22 using the spare line instead of the communication line that belongs to any one of the two communication line groups. Further, based on a result of the determination, the alternation point determination unit 35 generates setting information that indicates an alternation point (a communication line to be brought into an unused state) and holds the setting information in the setting information holding unit 37.

The alternation flag holding unit 36 holds a first alternation flag indicating whether or not a communication line that is being used has been switched based on the result of the comparison between the error rate and the threshold value TH1, in the two communication line groups. Further, the alternation flag holding unit 36 holds a second alternation flag indicating whether or not a communication line that is being used has been switched based on the result of the comparison between the error rate and the threshold value TH2.

The setting information holding unit 37 holds the setting information generated by the alternation point determination unit 35.

Hereinafter, an example of the communication line alternation operation by the information processing apparatus 20 will be described.

At first, it is assumed that the spare line is not used. In this case, the first alternation flag and the second alternation flag are in the following states.

Figure 4:
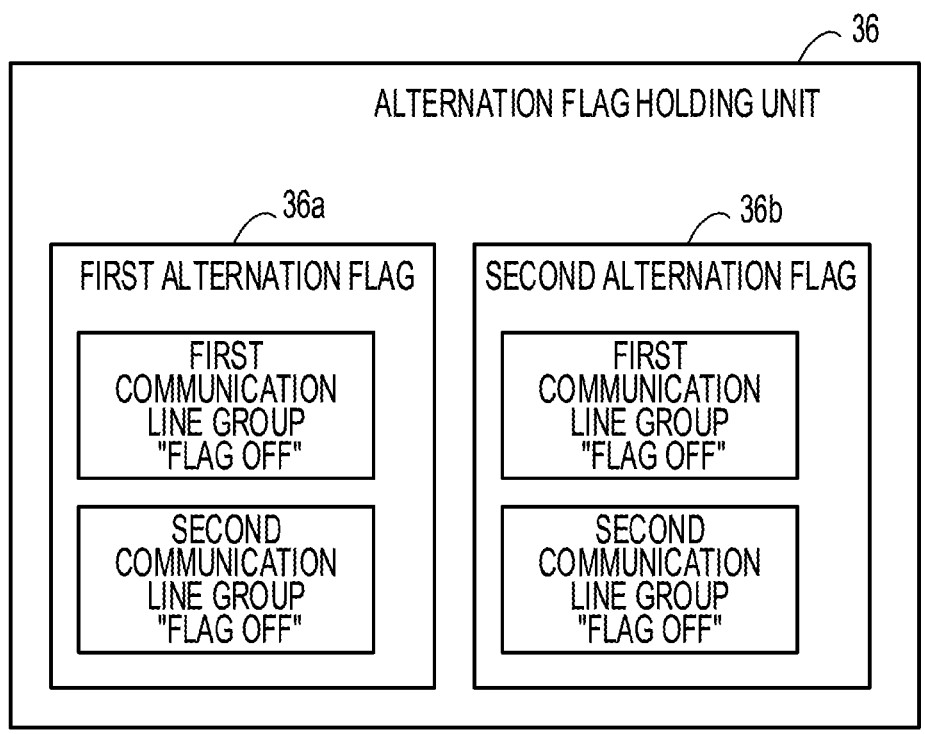
FIG. 4 is a view illustrating an example of a first alternation flag and a second alternation flag in an initial state.

FIG. 4 is a view illustrating an example of the first alternation flag and the second alternation flag in an initial state.

Both of a first alternation flag 36a and a second alternation flag 36b in the two communication line groups (the first communication line group and the second communication line group) are "OFF." Each of the first alternation flag 36a and the second alternation flag 36b may be expressed by a 2-bit value.

Further, in the initial state, the switching unit 30a1 is in the following state.

Figure 5:
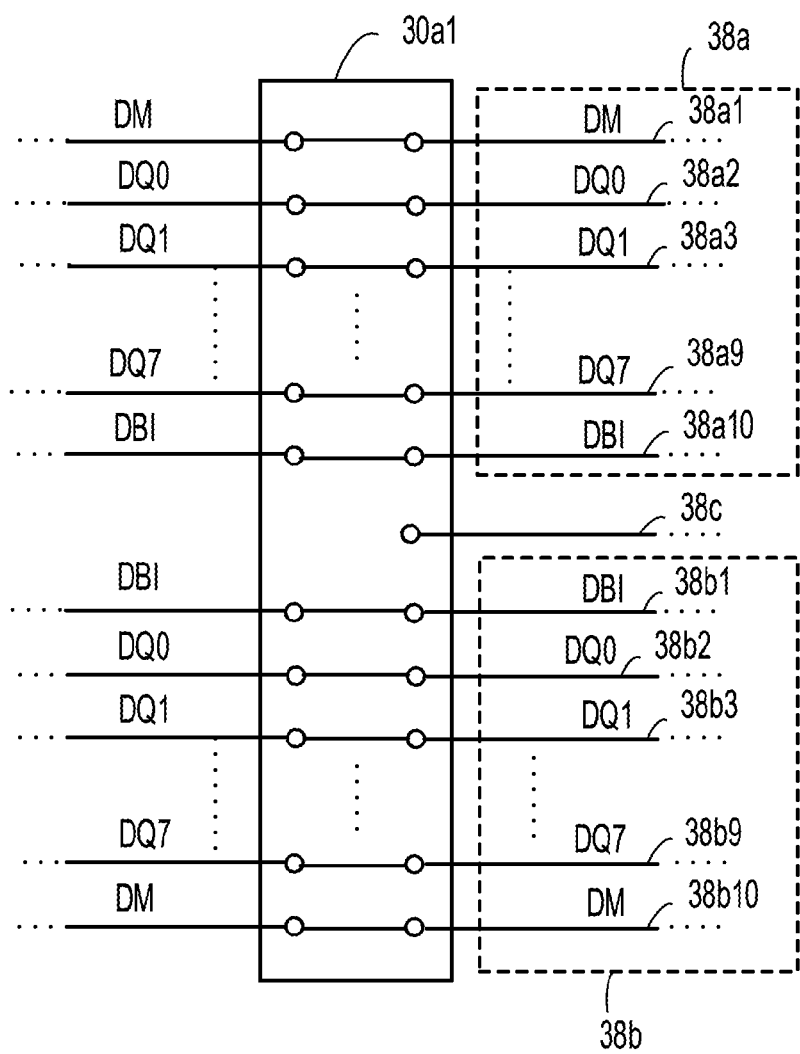
FIG. 5 is a view schematically illustrating the state of a switching unit in the initial state.

FIG. 5 is a view schematically illustrating the state of the switching unit in the initial state. FIG. 5 schematically illustrates the state of the switching unit 30a1 in the initial state, and the other switching units 30a2 to 30a8 are also in the same state.

In the initial state, the data signals DQ0, DQ1, . . . , DQ7, the data mask signal DM, and the data inversion control signal DBI are propagated by the communication lines 38a1, 38a2, 38a3, . . . , 38a9, and 38a10 included in the communication line group 38a. Further, the same signals as described above are propagated by the communication lines 38b1, 38b2, 38b3, . . . , 38b9, and 38b10 included in the communication line group 38b. No signal is propagated to the spare line 38c.

When an error rate and an update control signal for instructing an update of an error rate are received from the error rate measurement unit 31, the alternation point determination unit 21bc1 performs the following operation. In the following, it is assumed that the alternation point determination unit 21bc1 receives error rates of the signals that propagate through the communication lines 38a1 to 38a10 and 38b1 to 38b10 included in the communication line groups 38a and 38b illustrated in FIG. 5.

Figure 6:
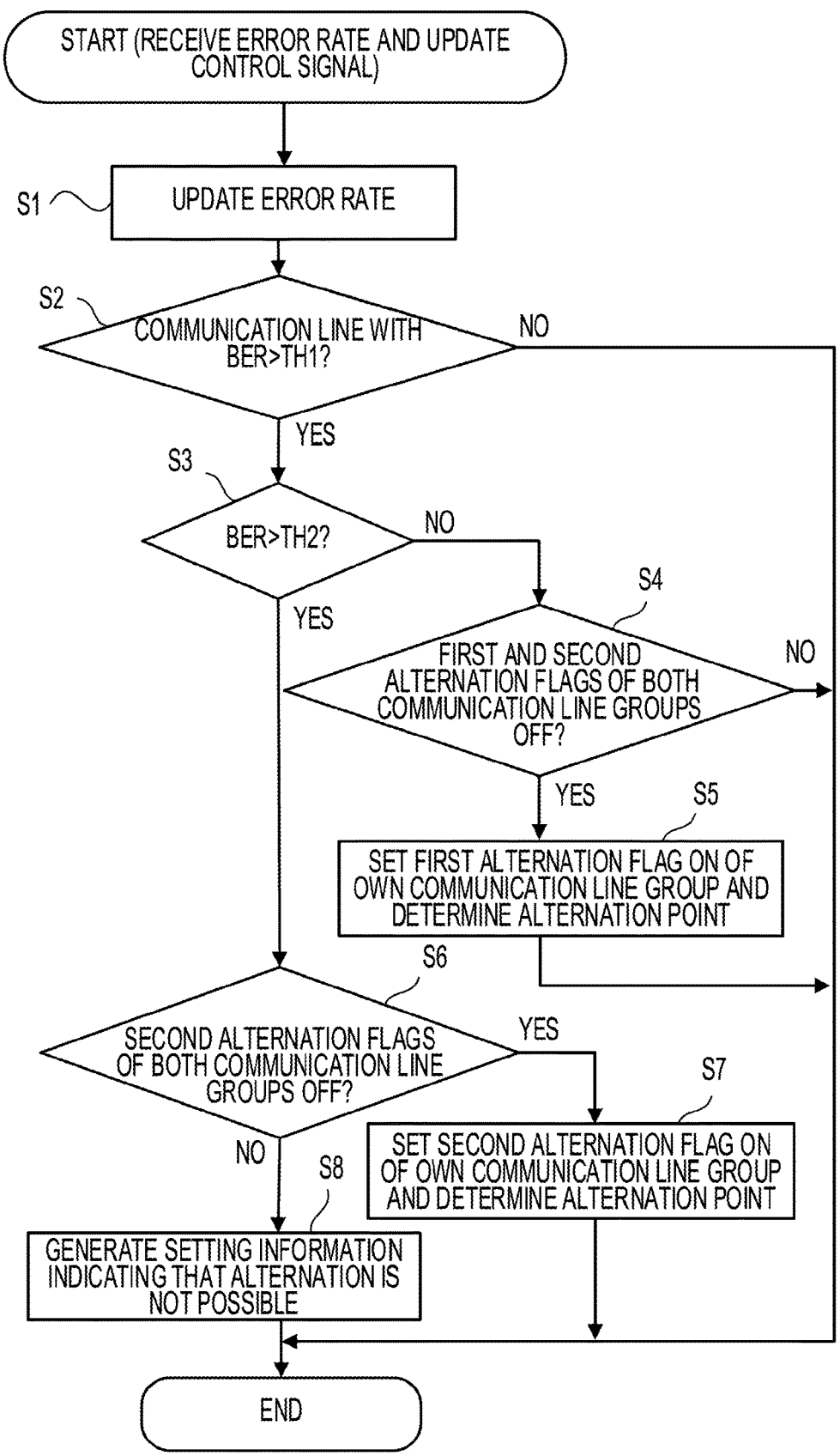
FIG. 6 is a flowchart illustrating a flow of an example of an operation of an alternation point determination unit.

FIG. 6 is a flowchart illustrating a flow of an example of the operation of the alternation point determination unit.

The error rate holding unit 34 of the alternation point determination unit 21bc1 updates the error rate held therein using the received error rate (step S1). The alternation point determination unit 35 determines whether or not there is a communication line in which an updated error rate BER becomes higher than the threshold value TH1 (step S2). When it is determined that there is no communication line in which the error rate BER becomes higher than the threshold value TH1, the change of an alternation point is not performed, and the operation of the alternation point determination unit 21bc1 is ended.

When it is determined that there is a communication line in which the error rate BER becomes higher than the threshold value TH1, the alternation point determination unit 35 determines whether or not the error rate BER of the communication line is higher than the threshold value TH2 (step S3).

When it is determined that the error rate BER does not exceed the threshold value TH2, the alternation point determination unit 35 determines whether or not both the first alternation flag and the second alternation flag for the communication line groups 38a and 38b are OFF (step S4). When it is determined that both the first alternation flag and the second alternation flag for the communication line groups 38a and 38b are not OFF, since the spare line 38c is being used, the change of an alternation point is not performed, and the operation of the alternation point determination unit 21bc1 is ended.

When it is determined that both the first alternation flag and the second alternation flag for the communication line groups 38a and 38b are OFF, the alternation point determination unit 35 sets the first alternation flag of a communication line group to which a communication line where BER>TH1 belongs (described as an own communication line group in FIG. 6) to ON. Then, the alternation point determination unit 35 determines the communication line where BER>TH1 as an alternation point (step S5). In step S5, the alternation point determination unit 35 generates setting information in which the communication line where BER>TH1 is set as an alternation point (unused), and holds the generated setting information in the setting information holding unit 37. The setting information is set in the alternation point setting unit 32 of the HBM controller 21bb or the alternation point setting unit 22b of the HBM 22 at a predetermined timing, and the switching units 22a1 and 30a1 switch a communication line that is being used based on the setting information set in the alternation point setting units 22b and 32.

Figure 7:
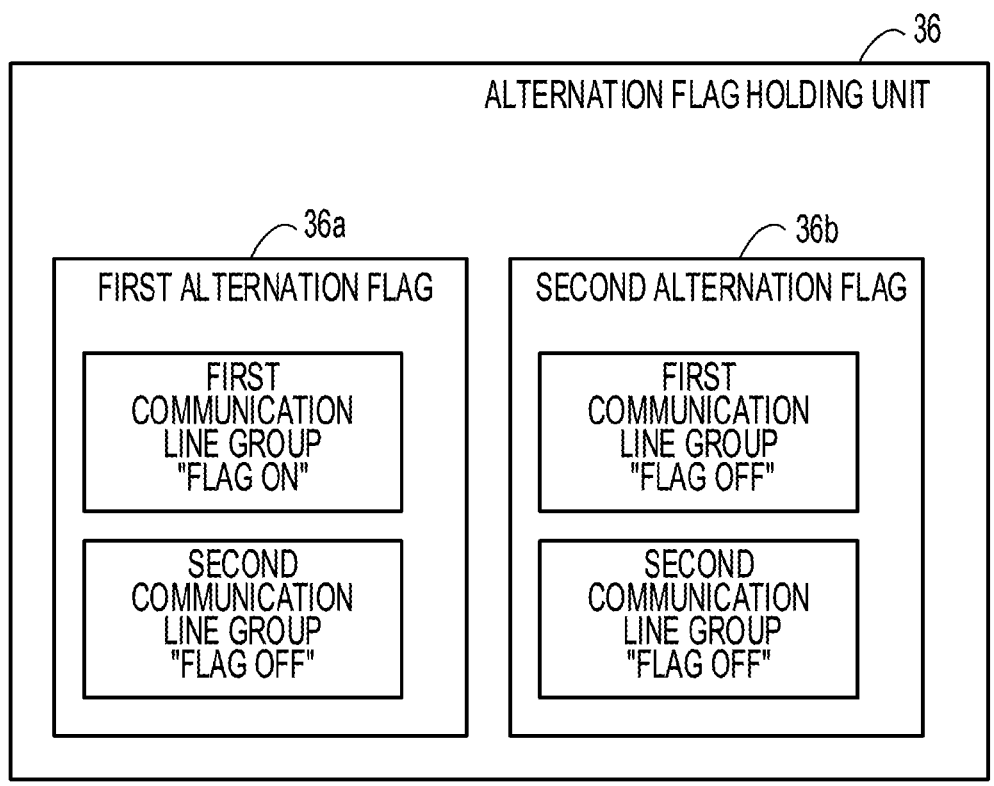
FIG. 7 is a view illustrating a modification of the first alternation flag.

FIG. 7 is a view illustrating a modification of the first alternation flag.

The flag of the first communication line group (e.g., any one of the communication line groups 38a and 38b) that has been "OFF" in the first alternation flag 36a of the initial stage illustrated in FIG. 4 is changed to "ON."

Figure 8:
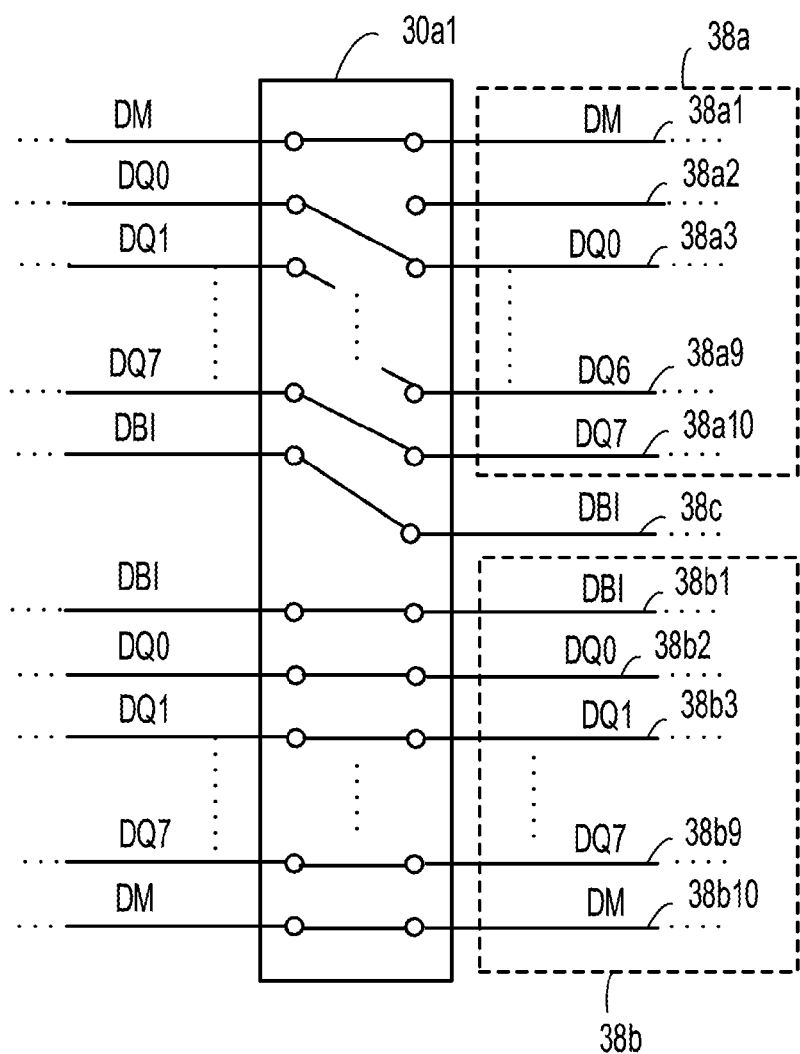
FIG. 8 is a view illustrating an example in which a communication line being used is switched.

FIG. 8 is a view illustrating an example in which a communication line that is being used is switched. FIG. 8 schematically illustrates the state of the switching unit 30a1 in a case where the communication line 38a2 is an alternation point.

The communication line that is being used is switched such that the communication line 38a2 that belongs to the communication line group 38a is brought into an unused state, and the data signal DQ0 is propagated by the next communication line 38a3. In addition, the communication line is switched such that the data inversion control signal DBI is propagated using the spare line 38c.

After step S5, the operation of the alternation point determination unit 21bc1 for one error rate reception is ended.

When it is determined in step S3 that the error rate BER of the communication line is higher than the threshold value TH2, the alternation point determination unit 35 determines whether or not both of the second alternation flags for the communication line groups 38a and 38b are OFF (step S6).

When it is determined that both of the second alternation flags for the communication line groups 38a and 38b are OFF, the alternation point determination unit 35 sets the second alternation flag of a communication line group to which a communication line where BER>TH2 belongs (described as an own communication line group in FIG. 6) to ON. Then, the alternation point determination unit 35 determines the communication line where BER>TH2 as an alternation point (step S7). In step S7, the alternation point determination unit 35 generates setting information in which the communication line where BER>TH1 is set as an alternation point (unused), and holds the generated setting information in the setting information holding unit 37. The setting information is set in the alternation point setting unit 32 of the HBM controller 21bb or the alternation point setting unit 22b of the HBM 22 at a predetermined timing, and the switching units 22a1 and 30a1 switch a communication line that is being used based on the setting information set in the alternation point setting units 22b and 32.

Figure 9:
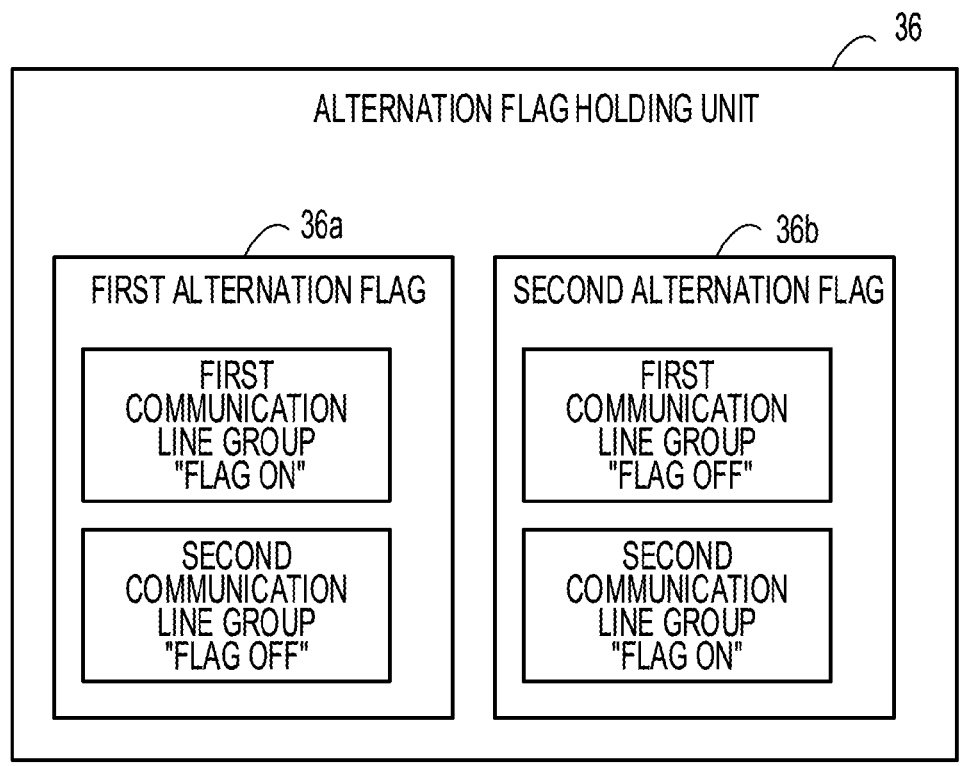
FIG. 9 is a view illustrating a modification of the second alternation flag.

FIG. 9 is a view illustrating a modification of the second alternation flag.

The flag of the second communication line group (e.g., any one of the communication line groups 38a and 38b) that has been "OFF" in the second alternation flag 36b of the initial stage illustrated in FIG. 4 is changed to "ON."

In addition, as illustrated in FIG. 9, in the first alternation flag 36a, the flag of the first communication line group (e.g., any one of the communication line groups 38a and 38b) is also "ON," and the spare line 38c is being used instead of a communication line belonging to the first communication line group. However, when the flag of the second communication line group in the second alternation flag 36b becomes "ON," the spare line 38c is used instead of a communication line belonging to the second communication line group.

Figure 10:
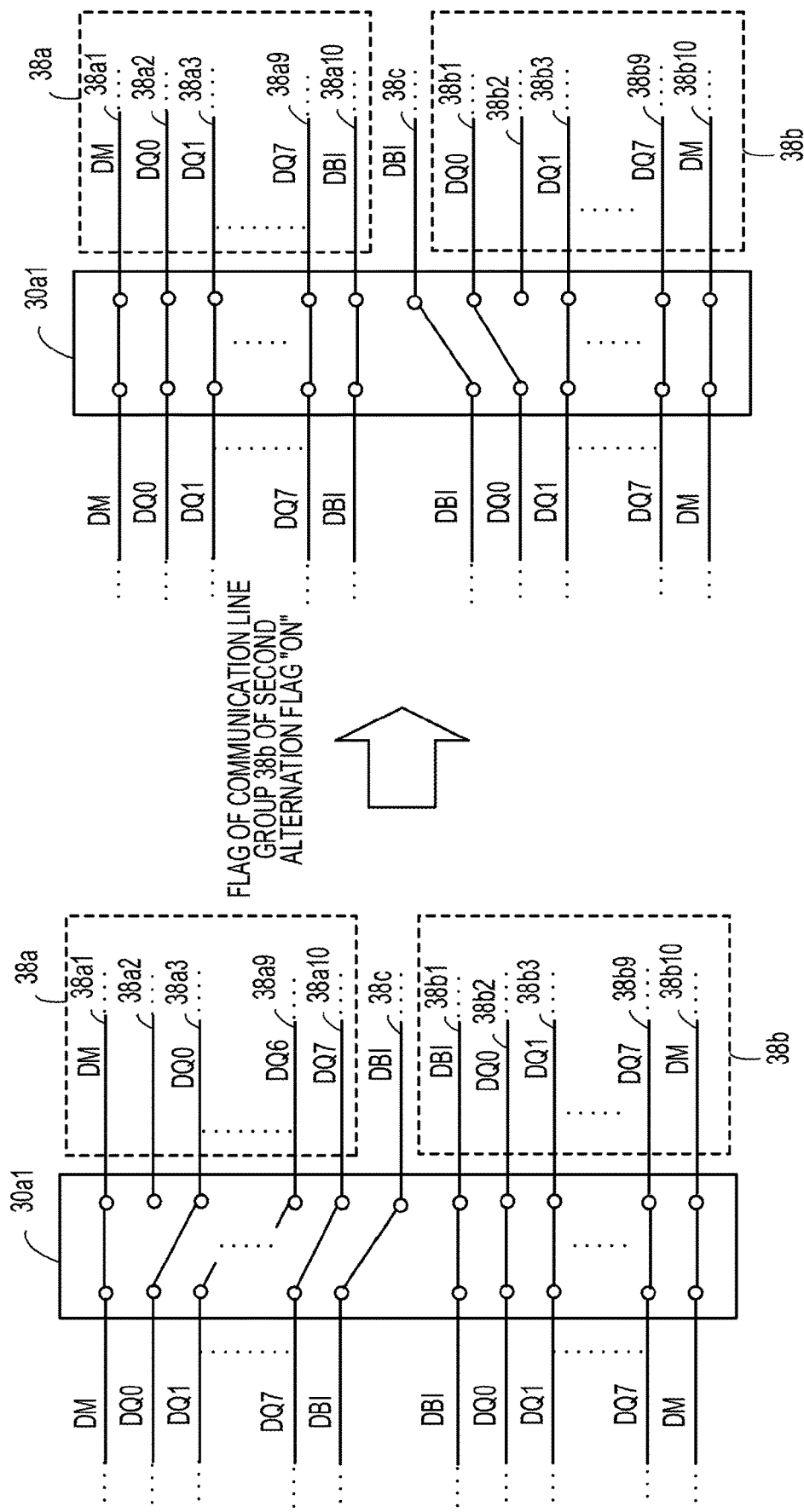
FIG. 10 is a view illustrating an example in which a communication line is switched when the second alternation flag becomes ON in a state where a spare line is being used.

FIG. 10 is a view illustrating an example in which a communication line is switched when the second alternation flag becomes ON in a state where the spare line is being used. FIG. 10 illustrates an example in which the flag of the second communication line group in the second alternation flag 36b becomes "ON" in a state where the spare line 38c is being used instead of a communication line that belongs to the communication line group 38a.

In the example of FIG. 10, the communication line that is being used is switched such that the communication line 38b2 that belongs to the communication line group 38b is brought into an unused state, and the data signal DQ0 is propagated by the adjacent communication line 38b1. In addition, the communication line is switched such that the data inversion control signal DBI is propagated using the spare line 38c.

After step S7, the operation of the alternation point determination unit 21bc1 for one error rate reception is ended.

When it is determined in step S6 that at least one of the second alternation flags of the communication line groups 38a and 38b is ON, the alternation point determination unit 35 generates setting information indicating that an alternation is not possible (step S8). In addition, the alternation point determination unit 35 may hold the setting information indicating that an alternation is not possible in the setting information holding unit 37 or may notify the setting information to the processor core unit 21a.

After step S8, the operation of the alternation point determination unit 21bc1 for one error rate reception is ended.

The alternation point determination unit 21bc1 performs the above-described operation each time an error rate is received from the error rate measurement unit 31.

According to the information processing apparatus 20 and the processor 21 of the second embodiment described above, the same effects as those in the information processing apparatus 10 and the processor 11 of the first embodiment may be obtained. That is, since one spare line provided for every two communication line groups is used with priority in a communication line group to which a communication line having a relatively high error rate belongs, the relatively worse communication line is salvaged and the communication stability is enhanced.

Further, the alternation point determination unit 21bc1 determines an alternation point using the first alternation flag and the second alternation flag as described above, so that it is possible to avoid an update of the setting information in a situation where a change of an alternation point is unnecessary. The situation where a change of an alternation point is unnecessary is, for example, a case where a signal of which the error rate exceeds the threshold value TH1 and does not exceed the threshold value TH2 is found again, or a signal of which the error rate exceeds the threshold value TH2 is found again. In such a situation, since the spare line 38c is already used instead of a communication line which has propagated a signal of the same error rate, it is unnecessary to change an alternation point.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor comprising:
    a memory control circuit connected to a memory by a first communication line group and a second communication line group and the memory control circuit configured to:
    measure an error rate of a signal that propagates through a communication line included in each of the first communication line group and the second communication line group;
    when a first error rate of a signal that propagates through a first communication line included in the first communication line group exceeds a first threshold value and the first communication line is used to perform a first communication with the memory, switch the first communication line to a spare line as a communication line used to perform the first communication;
    when the first communication is performed using the spare line, a second error rate of a signal that propagates through a second communication line included in the second communication line group exceeds a second threshold value higher than the first threshold value, the second communication line is used to perform a second communication with the memory, and the first error rate is lower than the second threshold value, switch the spare line to the first communication line as a communication line used to perform the first communication and switch the second communication line to the spare line as a communication line used to perform the second communication;
    generate setting information that indicates the first communication line or the second communication line to be brought into an unused state, based on a result of a comparison between the error rates and the first and second threshold values;
    switch to use the spare line to perform the first communication or the second communication based on the setting information;
    hold a first flag that indicates whether a communication line used for the first communication or the second communication is switched based on a result of a comparison between an error rate and the first threshold value;
    hold a second flag that indicates whether a communication line used for the first communication or the second communication is switched based on a result of a comparison between an error rate and the second threshold value; and
    determine whether to use the spare line to perform the first communication or the second communication based on the results of the comparisons and the first and second flags; and
    a processor core configured to exchange information with the memory via the memory control circuit.

2. The processor according to claim 1, wherein the second threshold value is an upper limit value of an error rate at which a communication is possible or an error rate at which a communication is not possible.

3. An information processing apparatus comprising:
    a memory;
    a memory control circuit connected to the memory by a first communication line group and a second communication line group and the memory control circuit configured to:
    measure an error rate of a signal that propagates through a communication line included in each of the first communication line group and the second communication line group;
    when a first error rate of a signal that propagates through a first communication line included in the first communication line group exceeds a first threshold value and the first communication line is used to perform a first communication with the memory, switch the first communication line to a spare line as a communication line used to perform the first communication;
    when the first communication is performed using the spare line, a second error rate of a signal that propagates through a second communication line included in the second communication line group exceeds a second threshold value higher than the first threshold value, the second communication line is used to perform a second communication with the memory, and the first error rate is lower than the second threshold value, switch the spare line to the first communication line as a communication line used to perform the first communication and switch the second communication line to the spare line as a communication line used to perform the second communication;
    generate setting information that indicates the first communication line or the second communication line to be brought into an unused state, based on a result of a comparison between the error rates and the first and second threshold values;
    switch to use the spare line to perform the first communication or the second communication based on the setting information;
    hold a first flag that indicates whether a communication line used for the first communication or the second communication is switched based on a result of a comparison between an error rate and the first threshold value;
    hold a second flag that indicates whether a communication line used for the first communication or the second communication is switched based on a result of a comparison between an error rate and the second threshold value; and
    determine whether to use the spare line to perform the first communication or the second communication based on the results of the comparisons and the first and second flags; and
    a processor core configured to exchange information with the memory via the memory control circuit.

* * * * *